United States Patent [19]

Price et al.

[11] Patent Number: 4,845,344
[45] Date of Patent: Jul. 4, 1989

[54] HEATED WINDOWS

[75] Inventors: Norman W. Price; Ian D. Chantler, both of Stevenage, United Kingdom

[73] Assignee: British Aerospace Public Limited Company, London, England

[21] Appl. No.: 82,131

[22] Filed: Aug. 6, 1987

[30] Foreign Application Priority Data

Aug. 8, 1986 [GB] United Kingdom ............... 8619443

[51] Int. Cl.$^4$ .............................................. H05B 3/10
[52] U.S. Cl. ..................................... 219/547; 219/203; 219/522
[58] Field of Search ............... 219/547, 203, 522, 544, 219/546, 548, 552, 553; 29/611

[56] References Cited

U.S. PATENT DOCUMENTS

| 1,565,046 | 12/1925 | Bergdoll | 219/203 X |
| 1,822,884 | 9/1931 | Creighton | 219/203 X |
| 3,484,583 | 12/1969 | Shaw, Jr. | 219/203 X |

FOREIGN PATENT DOCUMENTS 2950321  6/1981  Fed. Rep. of Germany ...... 219/203

Primary Examiner—C. L. Albritton
Attorney, Agent, or Firm—Nixon & Vanderhye

[57] ABSTRACT

A heatable window, especially for optical equipment, comprising an elongate heating element located in one or more grooves formed in the window and maintained in place by adhesive material.

4 Claims, 2 Drawing Sheets

HEATED WINDOWS

This invention relates to heated windows and in particular, but not exclusively, to optical equipment which is subjected to extreme environmental conditions.

In certain atmospheric conditions mist or ice may form on the surface of windows and impair the performance of optical equipment behind the window. A method of overcoming icing or fogging is to heat the window electrically. However in some applications, such as when a high power laser is to pass through the window or if sensitive optical equipment is used to receive low light levels, it is necessary to either avoid obscuring the window with heating elements or to minimise the effect.

In this application the surface of the window must be heated evenly so that the optical properties of the window remain uniform and this is difficult to achieve for large areas of window. In established methods of de-icing, wires are bonded onto the outside surface of the window; however this may cause smearing during wiping of the window and the wires could be damaged by the wiping.

Another method is to bond wires to the inside surface of the windows. This enables the smooth outer surface to be wiped cleanly but a longer thermal path (i.e. the thickness of the window) is introduced between the elements and the outside surface of the window; consequently the window takes longer to de-ice and more energy is required. In another method wires are sandwiched between two layers of glass. As it is important optically that the outer surfaces of the final assembly are parallel to each other, these faces must be re-ground and polished after assembly, and is therefore expensive. Another approach is to lay a conductive film over the entire surface of the window but this reduces the optical transmissive properties of the window by up to 30% at some wavelengths.

According to one aspect of this invention there is provided an optical window member having an electrical heating element said window member including at least one groove provided in a surface of the window, and an electrically conducting heating element maintained within said grooves by means of adhesive material located substantially wholly within said grooves.

According to another aspect of this invention, there is provided a method of making an optical window member having an electrical heating element, said method comprising the steps of:
  (i) forming at least one groove in a surface of said window element, and
  (ii) laying an electrically conducting element in said grooves and bonding said element into the grooves by means of adhesive material located substantially wholly within said grooves.

According to yet another aspect of this invention there is provided an electrically heatable window comprising an optical radiation transmissive member which has two opposite surfaces and a peripheral surface extending between said two opposite surfaces, and an electrical heating element extending around said peripheral surface and fixed thereto by means of adhesive. According to yet another aspect of this invention there is provided an optical window member having a first electrical heating elment, said window member including at least one groove provided in a surface of the window and said first electrical heating element being inlaid in said groove and maintained within said grooves by means of adhesive material located substantially wholly within said grooves and the window member having a second electricl heating element which is wound around the periphery of the window member and is bonded in place by means of adhesive.

In one embodiment, the conducting elements are arranged to include parallel portions extending at spaced intervals across the window. Conveniently the conducting elements are arranged in parallel groups. Preferably the conducting elements in each group are arranged so that the total length of wire in a group is substantially the same as the total length of wire in any other group.

In one embodiment the conducting elements are arranged to include parallel portions extending at spaced intervals across the window. The spacing of the intervals may be regular or irregular. The conducting elements may be electrically connected in parallel, series - parallel groups or in series, preferably the conducting elements in each group are arranged so that the total resistance of wire in a given group is substantially the same as the total resistance of wire in any other group. The circuit can be arranged to give any desired heat distribution.

The present arrangement provides a smooth surface which can be easily wiped and in which the heating elements are in close contact with the deposits they are to disperse. The arrangement also enables a window to be de-iced rapidly.

Two specific embodiments of the invention will now be described by way of example only referring to the figures in which.

Figure 1:
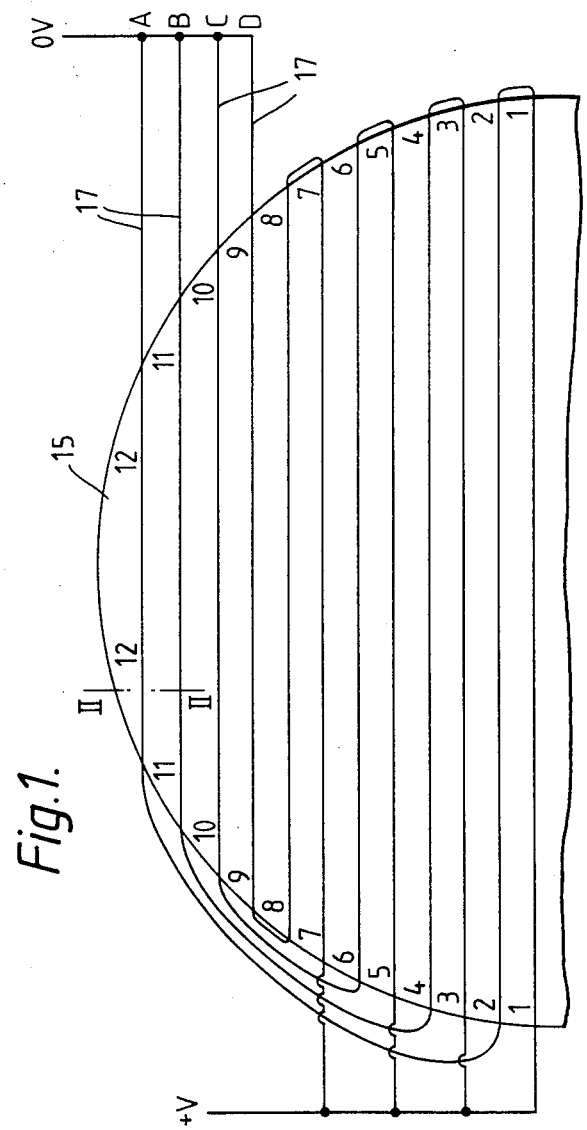
FIG. 1 shows the top portion of a window and illustrates the arrangement of one group of conducting wires.
Figure 2:
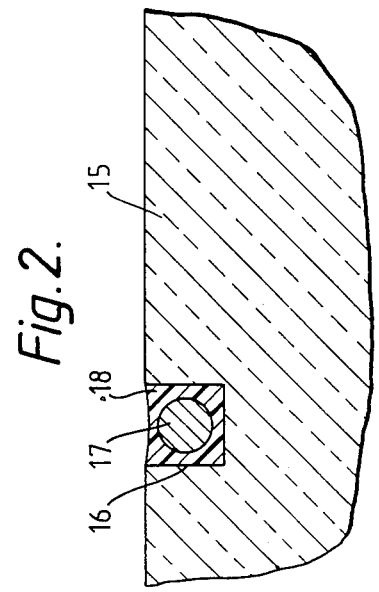
FIG. 2 is an enlarged section view through the window of FIG. 1 along the line II.
Figure 3:
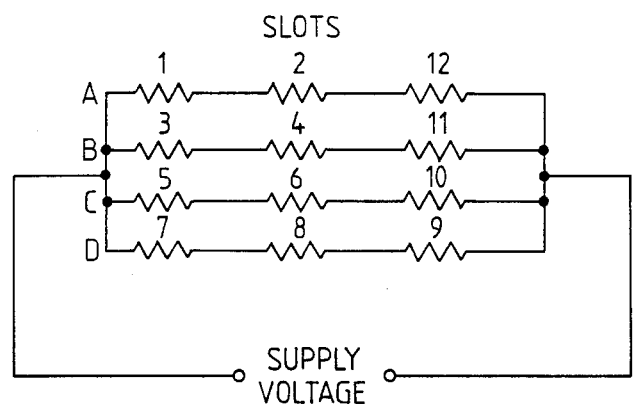
FIG. 3 is a schematic diagram of the heating elements in FIG. 1 showing the arrangement of the groups.

Referring initially to FIGS. 1 to 3 there is illustrated a first embodiment of heated window in which the heating element is placed in parallel grooves in the external surface of the window. In the embodiment illustrated the window 15 has a series of parallel slots 16 scored into one surface at a regular pitch to achieve a uniform temperature gradient across the surface of the window; however they may be irregularly spaced to create a different temperature gradient across the window. A further advantage of having irregularly spaced heating elements is that they disrupt the optical interference effects which might otherwise occur. The width of each slot must be minimal to reduce obscuration of the optical system and to improve thermal conduction from the wires. A wire 17 is placed in slot 16 and a low viscosity epoxy resin 18 or other suitable bonding agent is placed in the slot to bond the wire in place.

The wires 17 are arranged in several groups over the area of the window. FIG. 2 shows a group of four wires 17 in parallel on the upper part 15 of a window. In the group shown a wire A is inlaid in slots 12, 2, and 1; a second wire B is inlaid in slots 11, 4, 3; a third wire C inlaid in slots 10, 6 and 5 and a fourth wire D inlaid in the slots 9, 8 and 7. The four wires in the group are the same length; however, because of the circular shape of the window the length of slots progressively increase down the window from slot 12 to slot 1. To overcome the difference in slot length each wire is inlaid into a combination of slot lengths so that it traverses approximately the same length of window as the other wires and so that the total length of each combination of slots is approximately the same.

FIG. 3 is a schematic circuit diagram of the wiring arrangement in FIG. 1 and shows how the group is connected in a series parallel arrangement. The wiring arrangement disclosed in FIGS. 1 and 3 is an optimum arrangement which enables a uniform heat distribution to be achieved across a window; at the same time if a wire in a group should fail the failure will be localised to the single wire in that group and the rest of the group will continue to function properly.

Figure 4:
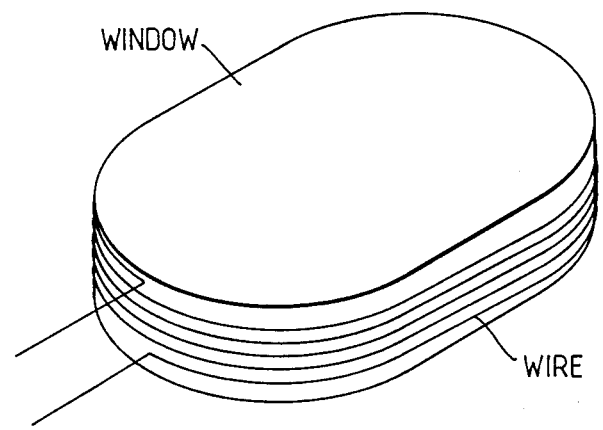
FIG. 4 is a perspective view of a window wound circumferentially with a heating element said heating element being held in position with adhesive.

A second embodiment of the invention is shown in FIG. 4 in which one or more coils or wire are wound around the periphery of the window and are adhered to the periphery by epoxy resin. An advantage of this arrangement is that no wires are placed over the surface of the window to cause obscuration.

In a further embodiment not illustrated a hybrid window is constructed by combining features from the other two windows. The window has wires inlaid in its surface which are supplemented by heating elements coiled around the periphery of the windows.

Although th above describes the construction of linear heating elements in the surface of a window the same principles can be applied to other arrangements without departing from the scope of the invention. The slots scored into the window need not be limited to straight parallel lines but could be cut to provide any number of variations or different designs to achieve different effects. For instance the slots might be scored as a circle around the periphery of the window or as a circle or a series of concentric circles and the wires arranged in coiled formation within the circle or circles. In these cases the power density for a given window can be varied by using wire of a different resistivity and/or by varying the number of turns in each coil. Any cross section of wire heating element can be used.

We claim:

1. An optical window member having a surface and an electrical heating element, said window member comprising:
   means defining at least one groove in said surface of said window member;
   an electrically conducting heating element located within said at least one groove; and
   adhesive means located substantially wholly within said at least one groove, for maintaining said element within said at least one groove.

2. A method of making an optical window member having an electrical heating element, said method comprising the steps of:
   forming at least one groove in a surface of said window member;
   laying an electrically conducting element in said at least one groove; and bonding said element into said at least one groove by means of adhesive material located substantially wholly within said at least one groove.

3. An optical window member having two opposite surfaces and a peripheral surface extending between said opposite surfaces and an electrical heating element, said window member comprising:
   means defining at least one groove in one of said opposite surfaces of said window member; and
   an electrically conducting heating element located within said at least one groove.

4. An optical window member have two opposite surfaces and a peripheral surface extending between said opposite surfaces and an electrical heating element, said window member comprising:
   means defining at least one groove in one of said opposite surfaces of said window member; and
   means for locating said electrically conducting heating element within said at least one groove.

* * * * *